(12) United States Patent
Shaw et al.

(10) Patent No.: US 6,481,539 B1
(45) Date of Patent: Nov. 19, 2002

(54) DISC BRAKE LINING WEAR MONITORING SYSTEM AND METHOD

(75) Inventors: Schuyler S. Shaw, Dayton, OH (US); Bryan P. Riddiford, Dayton, OH (US); Huang-Tsang Chang, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/925,864

(22) Filed: Aug. 9, 2001

(51) Int. Cl.$^7$ ............................................... F16D 66/00
(52) U.S. Cl. ............................. 188/1.11 L; 188/1.11 E; 188/73.45
(58) Field of Search ...................... 188/1.11 R, 1.11 W, 188/1.11 L, 1.11 E, 73.44, 73.45

(56) References Cited

U.S. PATENT DOCUMENTS

| | | | | |
|---|---|---|---|---|
| 3,605,085 A | * | 9/1971 | Fiorita et al. | 188/1.11 L |
| 4,016,533 A | * | 4/1977 | Ishikawa et al. | 188/1.11 L |
| 4,280,594 A | * | 7/1981 | Baum | 188/1.11 W |
| 4,316,529 A | * | 2/1982 | Yanagawa et al. | 188/1.11 L |
| 4,606,435 A | | 8/1986 | Johnson | |
| 4,850,454 A | | 7/1989 | Korody | |
| 4,869,350 A | * | 9/1989 | Fargier et al. | 116/208 |
| 5,087,907 A | * | 2/1992 | Weiler et al. | 188/1.11 L |
| 5,632,359 A | * | 5/1997 | Camps et al. | 188/1.11 L |
| 5,697,472 A | * | 12/1997 | Walker et al. | 188/1.11 W |
| 5,967,266 A | * | 10/1999 | Carnegie | 188/1.11 L |
| 6,095,290 A | * | 8/2000 | Takanashi | 188/1.11 E |
| 6,129,183 A | * | 10/2000 | Ward | 188/1.11 L |
| 6,276,494 B1 | * | 8/2001 | Ward et al. | 188/1.11 W |
| 2001/0009212 A1 | * | 7/2001 | Ohba et al. | 188/1.11 W |

* cited by examiner

Primary Examiner—Christopher P. Schwartz
Assistant Examiner—Devon Kramer
(74) Attorney, Agent, or Firm—Scott A. McBain

(57) ABSTRACT

A system and method for monitoring brake pad wear are provided. The system provides a vehicle disc brake caliper assembly including a boot assembly and least one friction pad. The system further provides at least one caliper bolt including a caliper bolt switch point, the caliper bolt movably positioned within the boot assembly. A conductive element is positioned a predetermined distance from the caliper bolt switch point. An electrical circuit is switched when the conductive element contacts the switch point. The contact is established when the friction pad wears to a predetermined level corresponding to the predetermined distance. The method provides a caliper bolt including a caliper bolt switch point. A conductive element is positioned a predetermined distance from the caliper bolt switch point. The predetermined distance is progressively decreased as the brake pad wears. An electrical circuit is switched when the conductive element contacts the caliper bolt switch point.

28 Claims, 5 Drawing Sheets

DISC BRAKE LINING WEAR MONITORING SYSTEM AND METHOD

TECHNICAL FIELD OF THE INVENTION

The present invention relates to vehicle disc brakes, and more specifically, the invention relates to a system and method for electrically monitoring disc brake lining wear.

BACKGROUND OF THE INVENTION

Virtually all wheeled vehicles utilize braking systems to selectively inhibit wheel rotation and, therefore, reduce vehicle speed. Braking may be accomplished by the use of a disc braking system whereby a friction force is applied at one or more wheel assemblies to inhibit wheel rotation. Numerous disc brake systems are known in the art. Typically, the vehicle operator would generate a brake signal through a pedal thereby activating the disc brake system. The system generally includes a rotor or disc secured to the vehicle wheel, a caliper assembly mounted to the vehicle chassis, and a pair of friction pads (also called brake pads or brake linings) disposed on opposite sides of the rotor. Upon activation of the disc brake system, the friction pads are moved toward one another into frictional engagement with the rotor thereby actuating the braking force and slowing the vehicle.

Repeated braking actuation commonly leads to a wearing of the friction pads and an overall reduction in thickness. Disc brake systems are designed to accommodate certain levels of wear by compensating for reductions in pad thickness. Continued pad wear, however, may lead to mechanical problems such as reduced braking efficiency and damage to the rotor and/or caliper assemblies. To overcome this, strategies have been developed to monitor friction pad wear and to alert the vehicle operator of excessive pad wear and potential mechanical problems.

The U.S. Pat. No. 4,850,454 issued Jul. 25, 1989 to Korody is an example of a disc brake lining wear sensor. In the Korody patent, the wear sensor comprises a plastic encapsulated sensor having a support bracket that is attached to the support member of the disc brake. As the inner and outer linings wear, a peripheral portion of the inner brake pad is displaced axially by the caliper piston. The peripheral portion wears away the sensor surface and engages a metal conductor to complete a circuit. In this manner, the inner brake pad wears away the sensor and completes the warning circuit.

The U.S. Pat. No. 4,606,435 issued August, 1986 to Johnson is an example of a brake lining wear sensor and indicator circuit. In the Johnson patent, the brake lining wear sensor includes a metal contact secured to a grounded brake lining support plate. When the brake lining is not worn, a semiconductive ceramic bushing establishes an electrical resistance between the contact and the support plate. When the brake lining is worn, the contact touches a grounded brake rotor or drum thereby causing a short to ground. Furthermore, the sensor is coupled to a lead wire to an indicator circuit that tests for resistance values to determine whether the contact is electrically grounded to the rotor.

The aforementioned patents may disclose suitable strategies for determining the brake lining wear status and relaying this information via an indicator apparatus. The prior art, however, generally requires that the sensor is either mounted external to the caliper assembly, associated with or part of the friction pad(s), and/or has a portion worn away along with the friction pad. This may increase maintenance and manufacturing costs by increasing parts and installation time. Therefore, it would be desirable to achieve a disc brake lining wear monitoring system and method that overcomes the aforementioned and other disadvantages.

SUMMARY OF THE INVENTION

One aspect of the invention provides a system for monitoring brake pad wear. The system comprises a vehicle disc brake caliper assembly including a boot assembly and at least one friction pad. The system further comprises at least one caliper bolt including a caliper bolt switch point, the caliper bolt movably positioned within the boot assembly. A conductive element is positioned a predetermined distance from the caliper bolt switch point. An electrical circuit is switched when the conductive element contacts the switch point. The contact is established when the friction pad wears to a predetermined level corresponding to the predetermined distance.

The conductive element may comprise a wire terminating in a flexible wiper member positioned adjacent to the caliper bolt. An insert member may retain the conductive element in a fixed position relative to the boot assembly during movement of the caliper mounting bolt. A brake wear indicator assembly comprising an indicator unit may be electrically attached to the conductive element. The brake wear indicator assembly may be capable of indicating brake wear status to a vehicle operator based upon the switching of the electrical circuit. The predetermined distance may be determined based upon a desirable wear allowance of the brake pad.

The conductive element may be movably positioned in an undercut region. The switch point may be positioned at one end of the undercut region. A closed circuit may be formed when the conductive element contacts the switch point.

The conductive element may be movably positioned in electrical contact with the caliper bolt. The conductive element may remain in electrical contact with the caliper bolt until the conductive element contacts the switch point. The switch point may comprise an undercut region. An open electrical circuit may be formed when the conductive element contacts the switch point.

Another aspect of the invention provides for a method of monitoring brake pad wear. The method provides a caliper bolt including a caliper bolt switch point. A conductive element is positioned a predetermined distance from the caliper bolt switch point. The predetermined distance is progressively decreased as the brake pad wears. An electrical circuit is switched when the conductive element contacts the caliper bolt switch point.

The conductive element may comprise a wire terminating in a flexible wiper member positioned adjacent to the caliper bolt. An insert member may retain the conductive element in a fixed position relative to a boot assembly during movement of the caliper mounting bolt. Brake wear status may be indicated to a vehicle operator based upon the switching of the electrical circuit. The predetermined distance may be determined based upon a desirable wear allowance of the brake pad.

The conductive element may be movably positioned in an undercut region. The switch point may be positioned at one end of the undercut region. A closed circuit may be formed when the conductive element contacts the switch point.

The conductive element may be movably positioned in electrical contact with the caliper bolt. The conductive element may remain in electrical contact with the caliper bolt until the conductive element contacts the switch point. The switch point may comprise an undercut region. An open electrical circuit may be formed when the conductive element contacts the switch point.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
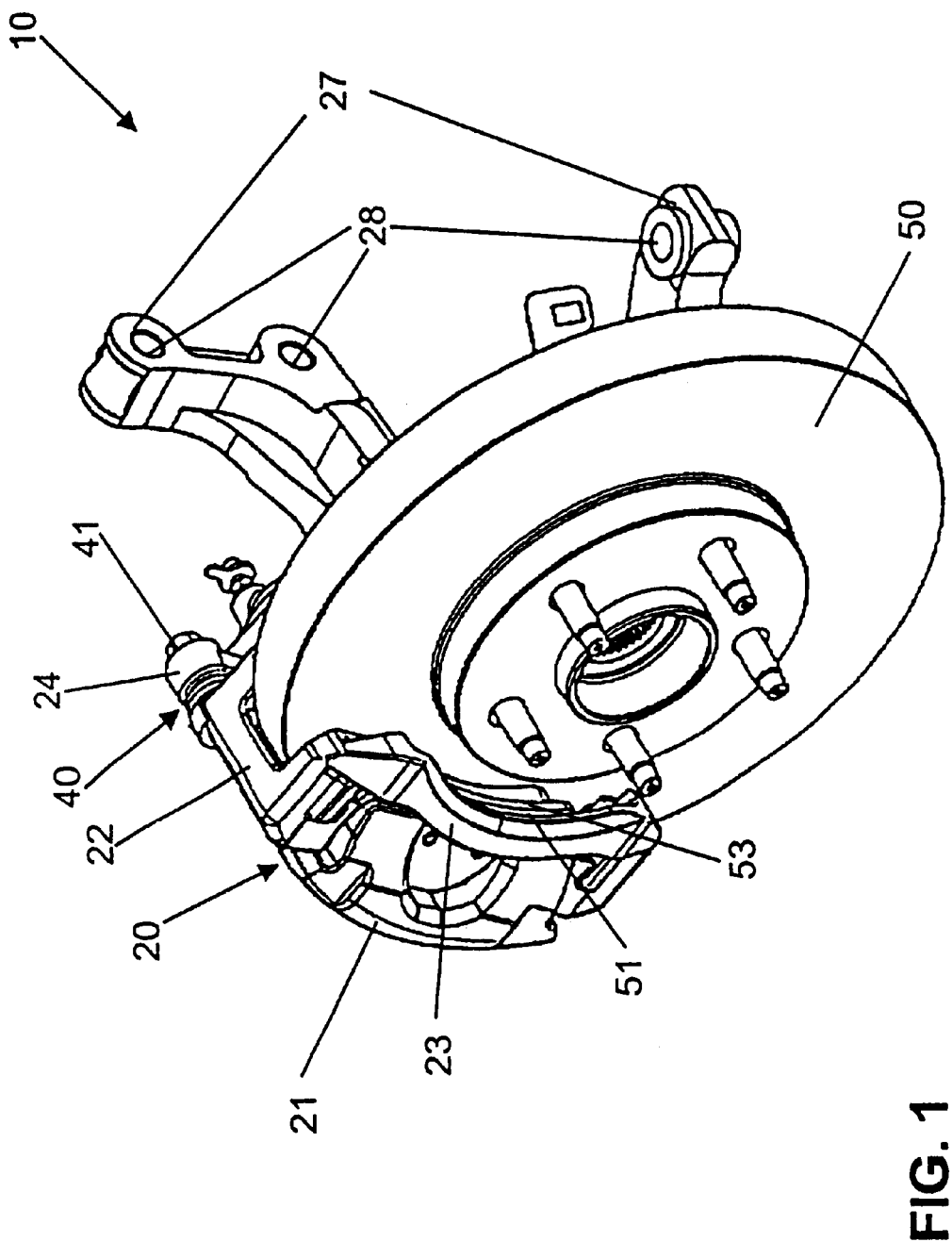
FIG. 1 is a perspective view of a vehicle disc brake assembly in accordance with this invention.

Referring to the drawings, FIG. 1 shows a vehicle disc brake assembly indicated generally as numeral 10. Those skilled in the art will recognize that while the invention is described for use with the particular disc brake structure shown in the drawings, the present invention may be used with other disc brake structures. The disc brake assembly 10 may include a caliper assembly 20, a boot assembly 40, a rotor 50, and at least one friction pad 53.

The caliper assembly 20 may include a means for attaching the vehicle disc brake assembly to a vehicle chassis (not shown). The caliper assembly attachment means may comprise mounting points 27 that permit a plurality of threaded bolts (not shown) to be positioned through mounting point openings 28. Those skilled in the art will recognize that numerous attachment means may be utilized to attach a disc brake assembly to the vehicle chassis.

Figure 2:
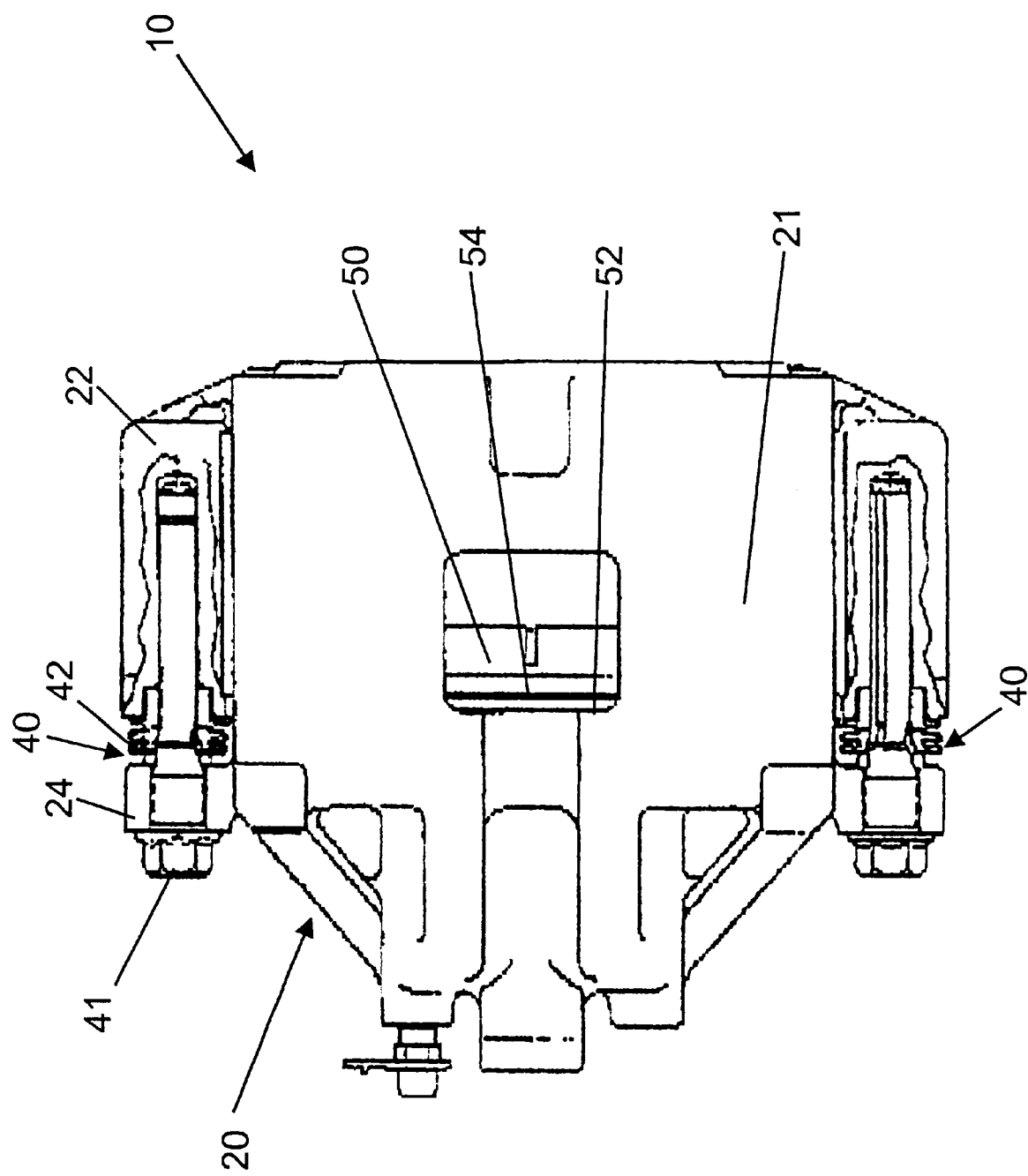
FIG. 2 is an elevated perspective view of a portion of the disc brake assembly shown in FIG. 1.
Figure 3:
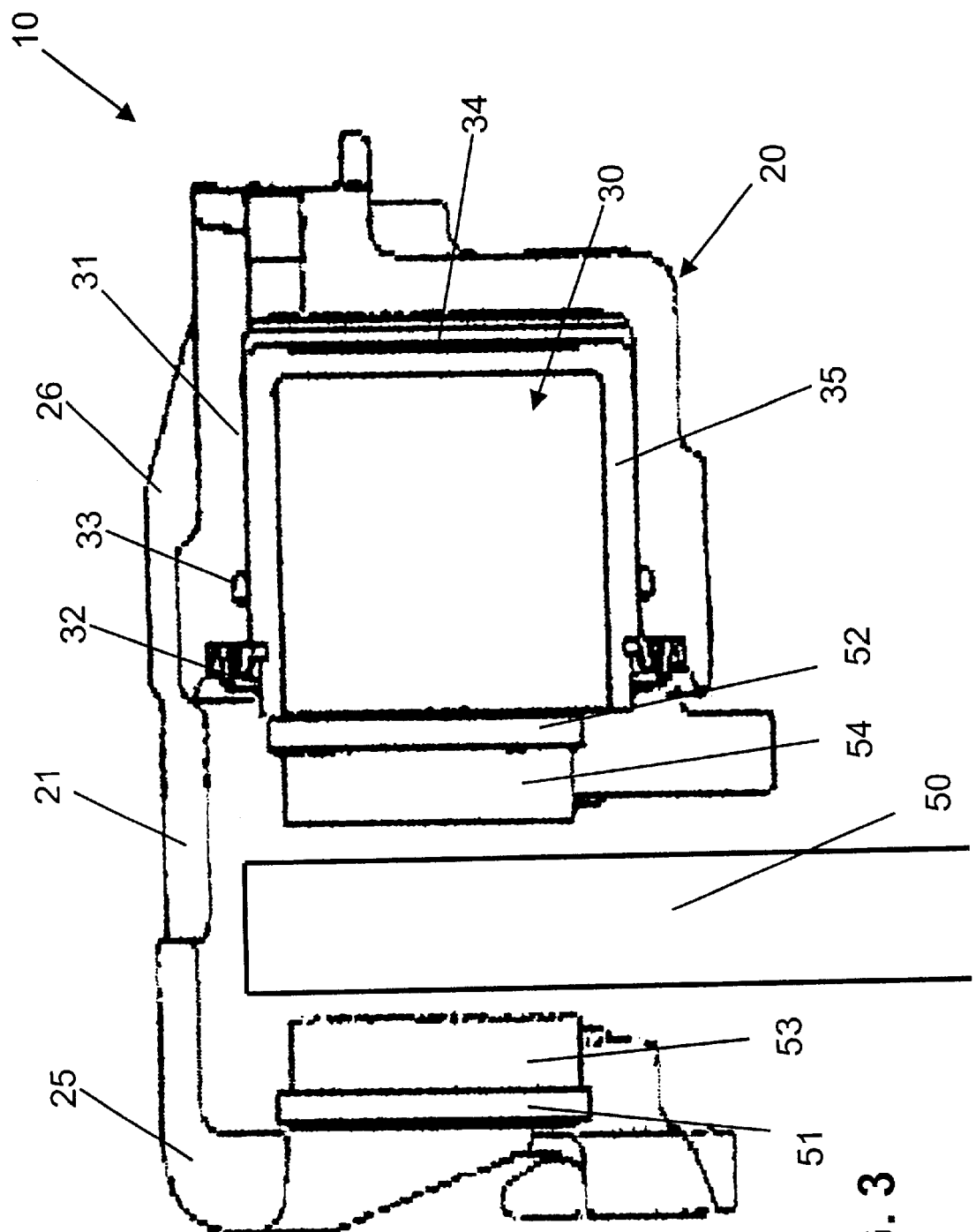
FIG. 3 is a cross-sectional view of a portion of the disc brake assembly shown in FIG. 1.

As further shown in FIGS. 2 and 3, the caliper assembly 20 may further include a caliper 21, bracket 22, tie bar 23, and caliper ears 24. The caliper 21 may be generally C-shaped and may be operably attached to the bracket 22. The caliper 21 may include an outboard leg 25 slidably connected to an inboard leg 26. The outboard leg 25 may be operably attached to an outboard backing plate 51 and outboard friction pad 53. The inboard leg 26 may be operably attached to an inboard backing plate 52 and inboard friction pad 54. The caliper assembly 20 may be designed to receive the disc shaped rotor 50 and apply pressure to the rotor 50 via the friction pads 53, 54 to achieve vehicle braking.

The caliper inboard leg 25 may contain brake actuation means, indicated generally by numeral 30. Those skilled in the art will recognize that the actuation means 30 may comprise any number of strategies to move one or more pistons 35, each slidably carried within a bore 31 formed in the inboard leg 26. For example, hydraulic, electrical, and mechanical means may be utilized to achieve brake actuation means. In the illustrated embodiment, hydraulic means are made to achieve actuation. The caliper assembly 10 may further include a dust boot seal 32 and an annular fluid seal 33. The dust boot seal 32 is intended to isolate the bore 31 from external contaminants (i.e. water, mud, salt, etc.). The annular seal 33 is designed to retain pressurized hydraulic fluid 34 within the bore.

In one embodiment, brake actuation is achieved when the pressurized hydraulic fluid 34 is forced into the bore 31 causing the piston 35 to slide toward and engage the inboard backing plate 52. The inboard backing plate 52 and friction pad 54 are pushed toward the rotor 50. Concurrently, the caliper outboard leg 25 engages the outboard backing plate 51 and friction pad 53 resulting in their movement toward the rotor 50. Therefore, when hydraulic fluid 34 is forced into the bore 31, the friction pads 53, 54 are operatively moved toward one another into frictional engagement with the rotor 50 achieving vehicle braking. It can be appreciated that repetitive applications of brake actuation cycles may result in the gradual wear and thinning of the friction pads 53, 54.

In accordance with the present invention, the specific construction of the boot assembly 40 and operation of the disc brake assembly 10 will be discussed. As shown in FIG. 2, two boot assemblies 40 may be operably attached to the caliper assembly 20 by a caliper ear 24 and bracket 22. As further shown in alternative embodiments FIGS. 4 and 5, the boot assembly 40 may include a bolt 41 slidably carried in a boot housing 42. During brake actuation, the caliper 21 and bolt 41 slide in the bracket 22 so that the outboard leg 25 engages the outboard backing plate 51 and friction pad 53. Furthermore, the boot housing 42 may be designed to allow for the slidable movement of the bolt 41 while providing a seal from external contaminants. The boot housing 42 may be manufactured from a pliable material such as rubber or other suitable polymer. The bolt 41 may be manufactured from a rigid material capable of conducting electrical current, such as steel or aluminum.

Figure 4:
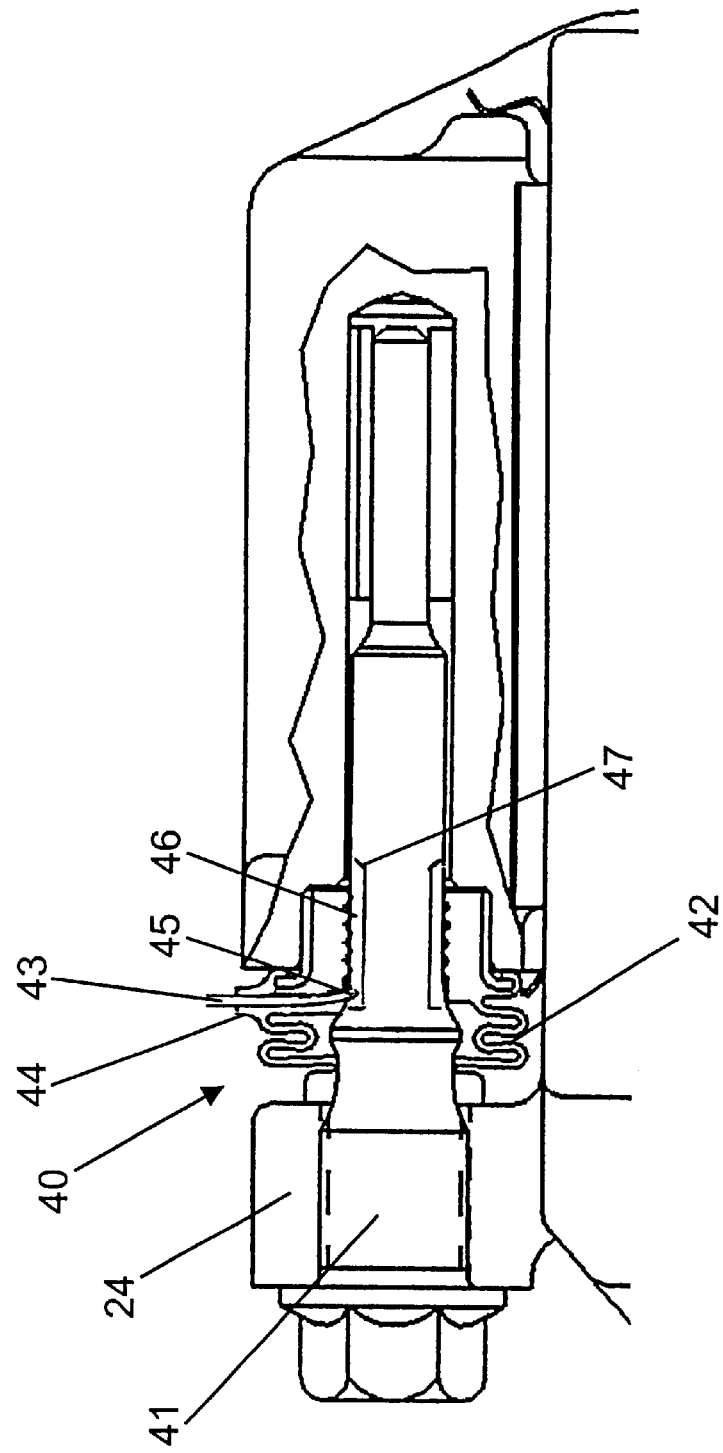
FIG. 4 is a fragmentary view of one embodiment of a disc boot assembly in accordance with the present invention.
Figure 5:
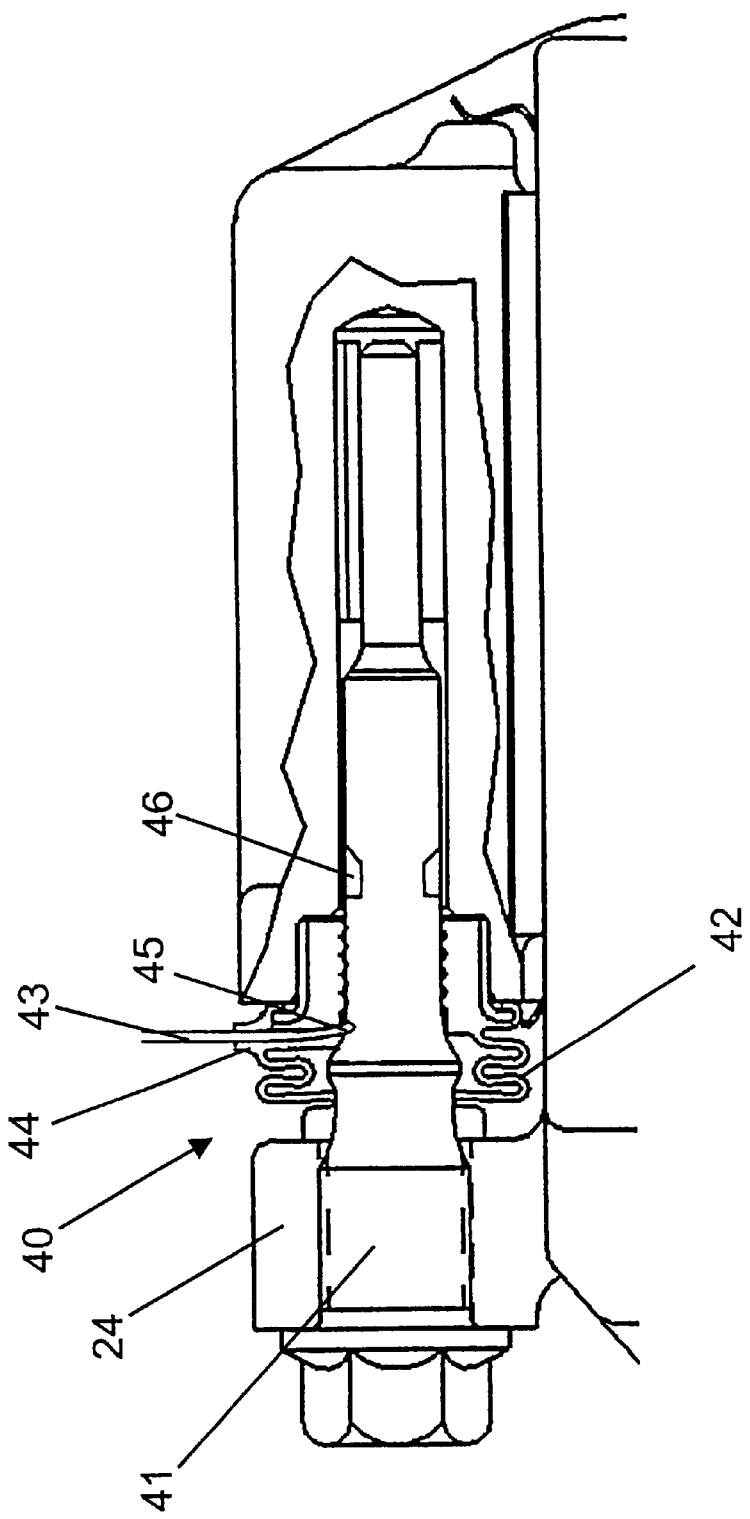
FIG. 5 is a fragmentary view of another embodiment of a disc boot assembly in accordance with the present invention.

Referring to FIGS. 4 and 5, the alternative embodiments are shown in an initial state whereby the vehicle brake is not applied and the friction pads 53,54 have a maximum designed thickness, i.e. little to no wear. A wire 43 may be positioned to penetrate the boot housing 42 and held in place by an insert member 44. The insert member 44 may be manufactured from a sufficiently rigid material such as plastic or metal. The wire 43 may be manufactured from a material capable of conducting insulated electric current, such as copper wire, and may terminate at a proximal end in a wiper structure 45. The wiper 45 may be manufactured from a flexible material designed to maintain a degree of rigidity. The wire 43 and wiper 45 comprise a conductive element. Those skilled in the art will recognize that a number of strategies for electrically conducting current may be employed with the current invention.

The bolt 41 may be electrically grounded to the vehicle chassis through caliper ear 24 contact. The bolt 41 may include an undercut region 46 intended to reduce its diameter. The wiper 45 may provide a means to ground an electrical circuit (not shown) by completing an electrical pathway between the vehicle chassis, bolt 41, and wire 43. The electrical circuit may be formed by a number of electrically connected components, including the wire 43, wiper 45, bolt 41, caliper assembly 20, and chassis. Those skilled in the art will recognize that a number of strategies exist for completing an electrical pathway between the chassis and wire 43 and that the following embodiment descriptions are merely illustrative of some of those possibilities. For the purposes of describing circuits, the term closed refers to a continuous, uninterrupted electrical pathway whereas the term open refers to a discontinuous, broken electrical pathway.

In the embodiment shown in FIG. 4, the wiper 45 is initially positioned in the undercut region 46. While in the undercut region 46, the wiper 45 does not contact the bolt 41 thereby resulting in an open electrical circuit. After the brake actuation process is initiated, the bolt 41 slidably moves out of the boot housing 42 and returns into the housing after the brake is released. The wiper 45 remains in the undercut region 46 during the outward and inward bolt 41 movement cycle thereby maintaining the open electrical circuit. The undercut region 46 length is predetermined to maintain the open electrical circuit during most brake actuation cycles. As the friction pads 53,54 wear thinner due to repeated actuation cycles, the bolt 41 progressively moves further out of the boot housing 42. Eventually, the bolt 41 moves a sufficient distance out of the boot housing 42 to permit the wiper 45 to physically contact a circuit switch point. In this embodiment, the switch point comprises a bolt shoulder portion 47. The contact between the wiper 45 and the bolt 41 produces electrical continuity and switches the open electrical circuit to a closed electrical circuit.

In the embodiment shown in FIG. 5, the wiper 45 is initially positioned in electrical contact with the bolt 41 thereby producing a closed electrical circuit. After the brake actuation process is initiated, the bolt 41slidably moves out of the boot housing 42 and returns into the housing after the brake is released. The wiper 45 remains in electrical contact during the outward and inward bolt 41 movement cycles thereby maintaining the closed electrical circuit. The undercut 46 region is positioned a predetermined length from the initial position of the wiper 45 to maintain the closed electrical circuit during most brake actuation cycles. As the friction pads 53,54 wear thinner due to repeated actuation cycles, the bolt 41 progressively moves further out of the boot housing 42. Eventually, the bolt 41 moves a sufficient distance out of the boot housing 42 to permit the wiper 45 to physically contact a switch point. In this embodiment, the switch point comprises the undercut region 46. Contact between the wiper 45 and the undercut region 46 breaks electrical continuity between the wiper 45 and bolt 41 and switches the closed electrical circuit to an open electrical circuit.

In one embodiment, the distance between the initial wiper position and the switch point may be predetermined and correspond to the predetermined wear level of the friction pads. For example, the predetermined distance may be the sum of initial bolt outward movement distance and a desirable worn friction pad thickness. In one embodiment, the predetermined distance may be increased to permit greater friction pad wear. In another embodiment, the predetermined distance may be decreased to permit less friction pad wear. In another embodiment, the initial position of the wiper may be easily re-established or moved thereby changing the predetermined distance. This would allow for modifications in the predetermined wear level without requiring a new bolt undercut portion configuration. Furthermore, maintenance time and cost may be reduced since the sensor need not be changed with every friction pad replacement. The predetermined wear level, however, may be modified during instances of friction pad replacement to ensure optimal sensor operation. In another embodiment, only one of the two boot assemblies 40 shown in FIG. 3 need contain the wire, wiper, and bolt grounding mechanism to effectively monitor brake friction pad wear status. The other boot assembly may resemble those known in the art to reduce manufacture cost.

A brake wear indicator assembly (not shown) may be electrically connected to the wire 43. In one embodiment, the brake wear indicator assembly may comprise an indicator unit comprising a readout lamp mounted in the panel of the vehicle. The assembly may be electrically connected to a power supply and the wire to comprise the circuit. Therefore, when the circuit is switched opened or closed, the readout lamp may convey this information to the vehicle operator. In another embodiment, the brake wear indicator assembly may comprise an onboard vehicle computer. The vehicle computer may assess the circuit switch status and output the information as desired. Those skilled in the art will recognize that a number of devices or indicators may be electrically connected to the wire to monitor the electrical circuit and communicate the friction pad wear status to the vehicle operator.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. System for monitoring brake pad wear comprising:
 a disc brake caliper assembly including a boot assembly and least one friction pad;
 at least one caliper bolt including a caliper bolt switch point, the caliper bolt movably positioned within the boot assembly; and
 a conductive element positioned a predetermined distance from the caliper bolt switch point, the conductive element movably positioned in an undercut region, and the caliper bolt switch point positioned adjacent one end of the undercut region, wherein an electrical circuit is switched when the conductive element contacts the caliper bolt switch point, the contact established when the friction pad wears to a predetermined level corresponding to the predetermined distance.

2. The system of claim 1 wherein the conductive element comprises a wire terminating in a flexible wiper member positioned adjacent to the caliper bolt.

3. The system of claim 1 further comprising:
 an insert member to retain the conductive element in a fixed position relative to boot assembly during movement of the caliper bolt.

4. The system of claim 1 wherein the conductive element contacts the caliper bolt switch point forming a closed electrical circuit.

5. The system of claim 1 further comprising:
 a brake wear indicator assembly comprising an indicator unit electrically attached to the conductive element and capable of indicating brake wear status to a vehicle operator based upon the switching of the electrical circuit.

6. The system of claim 1 wherein the predetermined distance is determined based upon a desirable wear allowance of the brake pad.

7. Method of monitoring brake pad wear comprising:
 providing a caliper bolt including a caliper bolt switch point;
 positioning a conductive element a predetermined distance from the caliper bolt switch point;
 movably positioning the conductive element in an undercut region, the caliper bolt switch point positioned adjacent one end of the undercut region;
 progressively decreasing the predetermined distance as the brake pad wears; and switching an electrical circuit when the conductive element contacts the caliper bolt switch point.

8. The method of claim 7 wherein the conductive element comprises a wire terminating in a flexible wiper member positioned adjacent to the caliper bolt.

9. The method of claim 7 further comprising:

retaining the conductive element with an insert member in a fixed position relative to a boot assembly during movement of the caliper bolt.

10. The method of claim 7 further comprising:

forming a closed electrical circuit when the conductive element contacts the caliper bolt switch point.

11. The method of claim 7 further comprising:

indicating brake wear status to a vehicle operator based upon the switching of the electrical circuit.

12. The method of claim 7 further comprising:

determining the predetermined distance based upon a desirable wear allowance of the brake pad.

13. System for monitoring brake pad wear comprising:

a caliper bolt including a caliper bolt switch point means;

a conductive element positioned a predetermined distance from the caliper bolt switch point means;

movably positioning the conductive element in an undercut region, the caliper bolt switch point means positioned adjacent one end of the undercut region;

means for progressively decreasing the predetermined distance as the brake pad wears; and means for switching an electrical circuit when the conductive element contacts the caliper bolt switch point means.

14. System for monitoring brake pad wear comprising:

a disc brake caliper assembly including a boot assembly and least one friction pad;

at least one caliper bolt including a caliper bolt switch point, the caliper bolt movably positioned within the boot assembly; and a conductive element positioned a predetermined distance from the caliper bolt switch point, the caliper bolt switch point including an undercut region formed therein, wherein an electrical circuit is switched when the conductive element contacts the caliper bolt switch point, the contact established when the friction pad wears to a predetermined level corresponding to the predetermined distance.

15. The system of claim 14 wherein the conductive element comprises a wire terminating in a flexible wiper member positioned adjacent to the caliper bolt.

16. The system of claim 14 further comprising:

an insert member to retain the conductive element in a fixed position relative to boot assembly during movement of the caliper bolt.

17. The system of claim 14 wherein the conductive element is movably positioned in electrical contact with the caliper bolt, the conductive element remaining in electrical contact with the caliper bolt until the conductive element contacts the caliper bolt switch point.

18. The system of claim 17 wherein the conductive element contacts the caliper bolt switch point forming an open electrical circuit.

19. The system of claim 14 further comprising:

a brake wear indicator assembly comprising an indicator unit electrically attached to the conductive element and capable of indicating brake wear status to an operator based upon the switching of the electrical circuit.

20. The system of claim 14 wherein the predetermined distance is determined based upon a desirable wear allowance of the brake pad.

21. Method of monitoring brake pad wear comprising:

providing a caliper bolt including a caliper bolt switch point, the caliper bolt switch point including an undercut region formed therein;

positioning a conductive element a predetermined distance from the caliper bolt switch point;

progressively decreasing the predetermined distance as the brake pad wears; and switching an electrical circuit when the conductive element contacts the caliper bolt switch point.

22. The method of claim 21 wherein the conductive element comprises a wire terminating in a flexible wiper member positioned adjacent to the caliper bolt.

23. The method of claim 21 further comprising:

retaining the conductive element with an insert member in a fixed position relative to a boot assembly during movement of the caliper bolt.

24. The method of claim 21 further comprising:

movably positioning the conductive element in electrical contact with the caliper bolt, the conductive element remaining in electrical contact with the caliper bolt until the conductive element contacts the caliper bolt switch point.

25. The method of claim 21 further comprising:

forming an open electrical circuit when the conductive element contacts the caliper bolt switch point.

26. The method of claim 21 further comprising:

indicating brake wear status to an operator based upon the switching of the electrical circuit.

27. The method of claim 21 further comprising:

determining the predetermined distance based upon a desirable wear allowance of the brake pad.

28. System for monitoring brake pad wear comprising:

a caliper bolt including a caliper bolt switch point means, the caliper bolt switch point means including an undercut region formed therein;

a conductive element positioned a predetermined distance from the caliper bolt switch point means;

means for progressively decreasing the predetermined distance as the brake pad wears; and means for switching an electrical circuit when the conductive element contacts the caliper bolt switch point means.

* * * * *